Feb. 7, 1928.　　　　　　　　　　　　　　　　　　　　　　　1,658,059
E. A. ROCKWELL
APPARATUS FOR FEEDING FUEL BY PRESSURE TO INTERNAL COMBUSTION ENGINES
Original Filed Aug. 2, 1923
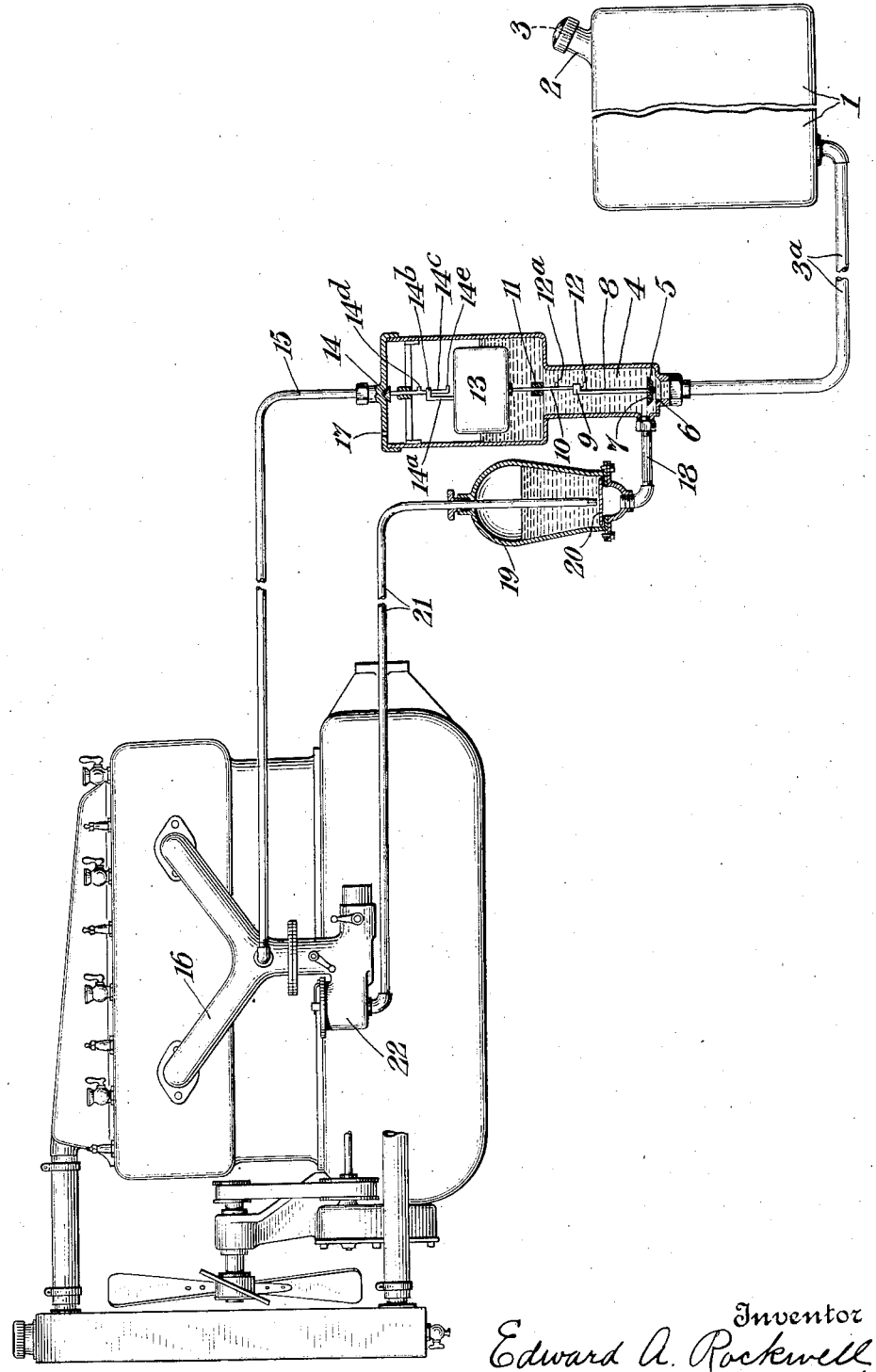
Inventor
Edward A. Rockwell,
By his Attorneys,
Prindle, Wright, Neal & Dean Patented Feb. 7, 1928.

1,658,059

UNITED STATES PATENT OFFICE.

EDWARD A. ROCKWELL, OF FOREST HILLS, NEW YORK, ASSIGNOR TO STEWART-WARNER SPEEDOMETER CORPORATION, OF CHICAGO, ILLINOIS, A CORPORATION OF VIRGINIA.

APPARATUS FOR FEEDING FUEL BY PRESSURE TO INTERNAL-COMBUSTION ENGINES.

Application filed August 2, 1923, Serial No. 655,237. Renewed February 10, 1927.

My invention relates particularly to an apparatus designed for feeding liquid fuel to internal combustion engines of many different kinds but has relation especially to the feeding of fuel to automobile engines.

The object of my invention is to provide an apparatus by means of which liquid fuel may be fed to internal combustion engines in a very simple manner. A further object is to feed the liquid fuel thereto through the agency of pressure induced by the flow of the fuel and particularly the flow of the fuel caused by partial return of the fuel to the fuel reservoir, which has been withdrawn therefrom with the aid of a vacuum.

Further objects of my invention will appear from the detailed description thereof contained hereinafter. While my invention is capable of embodiment in many different forms for the purpose of illustration I have shown only one form of the same in the accompanying drawings in which—

The figure is a diagrammatic representation of an apparatus which may be made in accordance with my invention.

In the drawings I have shown a fuel supply reservoir 1 having a fuel cap 2 of the usual kind provided with a vent opening 3. The fuel is conducted from the fuel reservoir 1 by means of a pipe 3ᵃ to an auxiliary storage chamber 4, the lower end of which is closed by a valve 5 adapted to seat against a valve seat 6 and provided with a bleed hole 7 for the purposes to be hereinafter described. The valve 5 is carried by a valve stem 8 having at its upper end a sleeve 9 which fits loosely around a rod 10 that passes upwardly through a guide bracket 11 secured to the interior of the storage chamber 4. The lower end of the rod 10 has two laterally offset portions 12 and 12ᵃ to act as stops for the sleeve 9 and the upper end of the rod 10 is connected to a float 13 located in the chamber 4. At its upper portion the float 13 is connected to control a valve 14 which is arranged to close the outlet to a passageway 15 leading to an engine manifold 16. The control of the valve 14 by the float 13 is accomplished by means of an upwardly directed rod 14ᵃ connected to the float 13 and having a sleeve 14ᵇ which passes around a stem 14ᶜ connected to the valve 14 and having two laterally directed stops 14ᵈ and 14ᵉ. In the upper portion of the chamber 4 there is, furthermore, located a small vent 17. Near the lower end of the chamber 4 there is located a pipe 18 which leads to a pressure chamber 19 closed at its upper portion and provided with a plate valve 20 located at its lower portion and which is arranged to open upwardly to admit liquid from the pipe 18. The upper portion of the chamber 19 is so arranged as to retain a body of trapped air therein under pressure, the pressure from which forces upwardly out of the chamber 19 through a pipe 21 the liquid fuel to an engine carburetor 22 connected to the manifold 16.

In the operation of my invention, it will be assumed that a body of gasoline is contained in the reservoir 1, that a vacuum is applied from the manifold 16 through the pipe 15 to the chamber 4 and that the level of the liquid in the chamber 4 is low, thus causing float 13 to be in its lowermost position unseating the valve 14 and seating the valve 5. The application of the vacuum will cause the liquid to flow from the reservoir 1 into the reservoir 4 past the valve 5. This will continue until the liquid level in the chamber 4 causes the float 13 to rise and thus seat the valve 14 and close the vacuum pipe 15. As a result the atmospheric pressure will become restored in the chamber 4 through the vent 17, thus allowing the liquid in the chamber 4 to again flow downwardly through the tube 3ᵃ in the direction of the reservoir 1 inasmuch as the valve 5, in this position of the parts, is upheld by the float 13. It will be understood that the force of the atmospheric pressure exerted upon the valve 14 will retain the valve 14 in its upheld position. The flow of the fluid will continue in this way until the level of the liquid in the chamber 4 is at a sufficiently low level to seat the valve 5. The seating of the valve 5 in this way will cause the liquid to flow down owing to its momentum, into the pressure chamber 19 past the valve 20, thus compressing the air or vapor in the upper portion of the chamber 19 and forcing the liquid under pressure through the pipe 21 to the carburetor 22. The lowering of the level of the liquid in the chamber 4 will continue in this way until the float 13 has moved downwardly to a still lower level whereupon it will unseat the valve 14 and thus again apply the vacuum to the chamber 4. The vacuum having been again applied to the chamber 4 the valve 20, will again become seated and the liquid will now flow from the reservoir 1 upwardly into the chamber 4 to repeat the series of operations. The bleed hole 7 assists in unseating the valve 5 when the vacuum is again applied to said chamber 4. In this way the chamber 4 will alternately fill and discharge the liquid therefrom into the pressure chamber 19, thus always maintaining a pressure within said chamber through the agency of which the gasoline is at all times available for being supplied to the carburetor.

While I have described my invention above in detail I wish it to be understood that many changes may be made therein without departing from the spirit of the same.

I claim:

1. In combination with a low level liquid source and a pressure chamber at a higher level having communication from its lower part leading upward for delivery of liquid from the pressure chamber to a higher level than that of said chamber, a storage chamber and a conduit for liquid flow between said low level source and said storage chamber, means for causing the flow through said conduit to be alternately from the low level source toward the storage chamber and from the storage chamber back toward the low level source, and means located at a point between the low level source and the communication of said conduit with the pressure chamber for restricting the backflow toward the low level source after a substantial lowering of the level in the storage chamber has resulted from such backflow, whereby the momentum of the liquid in the initial flow toward the low level liquid source before its stoppage by said restricting means operates for forcing the liquid into the pressure chamber for developing pressure therein.

2. In combination with a liquid source, a storage chamber and a pressure chamber, a conduit for liquid flow between the liquid source and the storage chamber, a liquid flow connection from the conduit to the pressure chamber, means operated by change of liquid level in the storage chamber for alternating the flow between the conduit into and out of the storage chamber, a valve in the conduit between the liquid source and the connection to the pressure chamber seating for stopping the flow toward the liquid source, and connection for operating the valve by the means for alternating the flow, adapted, during the initial part of each period of outflow from the storage chamber, to hold the valve open and to seat it abruptly only after partial evacuation of the storage chamber.

3. In combination with a low level liquid source and a pressure chamber at a higher level having communication from its lower part leading upward for delivery of liquid from the pressure chamber to a higher level than that of said chamber; a vacuum chamber at a higher level than the pressure chamber, and a conduit for liquid flow, both from and back toward the low level source, the vacuum chamber having also connection with a source of suction for inducing flow from the low level source, a liquid flow connection from said conduit to the pressure chamber for liquid flow from the conduit into said pressure chamber, and means controlled by change of level in the vacuum chamber for interrupting the suction and the resulting flow from the low level source toward the vacuum chamber and permitting gravity discharge back toward the low level source of the liquid previously lifted, and means also controlled by a further change of level of the liquid in the vacuum chamber for abruptly interrupting said back flow at a point in the conduit beyond the connection leading therefrom to the pressure chamber.

4. In the construction defined in claim 3, foregoing, the means for interrupting suction to permit outflow from the vacuum chamber being a float-controlled valve at the suction connection of the vacuum chamber, a float operative by rise of level in the vacuum chamber to close said valve, a valve which controls the flow of liquid in the conduit toward the vacuum chamber, and a port at which it seats located between the low level source and the connection from said conduit leading to the pressure chamber, said valve being connected to the float for opening of the valve in and by the movement of the float which cuts off the suction, and for closing after partial evacuation of the vacuum chamber.

5. In combination with a source of liquid, a storage chamber; a conduit connecting said chamber to said source; means for alternation of lower and higher pressure in the storage chamber; a pressure chamber connected for receiving liquid from the storage chamber for delivery from said pressure chamber to a point of use; means for causing liquid flow alternately in opposite directions in the storage chamber, the flow in one direction being from the liquid source and in the opposite direction toward the liquid source and toward the pressure chamber and means for restricting the flow toward the liquid source adapted to operate for said restriction only after a substantial lowering of the level in the storage chamber has resulted from such flow, whereby the flow in the last mentioned direction is maintained by the inertia of the liquid in addition to the head of the liquid in the storage chamber.

6. In combination with an apparatus to be supplied with liquid, a chamber constituting a liquid source, a pressure chamber interposed in the line of liquid communication from the liquid source to said apparatus, a storage chamber interposed in the line of communication from the liquid source to the pressure chamber, means for alternating lower and higher fluid pressures in the storage chamber for alternately drawing liquid from the liquid source to the storage chamber and forcing the same into the pressure chamber; a valve which controls communication between the liquid source and the storage chamber, means arranged to operate for seating said valve to arrest backflow toward the liquid source after a substantial amount of back flow has occurred; the communication from the storage chamber to the pressure chamber being free, and means restricting backflow, whereby upon change from higher to lower pressure in the pressure chamber the inertia of the liquid moving from the storage chamber to the pressure chamber under the higher pressure operates for maintaining the flow for developing pressure in the pressure chamber.

7. In combination a source of fuel supply a storage chamber, a conduit connecting said chamber to said source of fuel supply, a device for providing intermittent increase of pressure in the storage chamber; a pressure chamber connected to be supplied with liquid from the storage chamber, and means for causing the fuel at a part of its course between the fuel source and the pressure chamber to flow alternately in opposite directions, whereby the inertia due to its flow in one direction tends to maintain its flow into the pressure chamber beyond the stage of higher pressure in the storage chamber.

8. In the construction defined in claim 7, a float in the storage chamber and a valve controlling flow between the storage chamber and the fuel source operated by the float for closing after substantial backflow toward the fuel source producing a predetermined low level of the liquid in the storage chamber, whereby the flow from the storage chamber toward the fuel source is interrupted suddenly during the stage of higher pressure in the storage chamber, and the inertia of the liquid in the storage chamber due to its movement for flow toward the fuel source before the closing of the valve operates for driving it into the pressure chamber for developing pressure therein.

In testimony that I claim the foregoing, I have hereunto set my hand this 12th day of July, 1923.

EDWARD A. ROCKWELL.